United States Patent
Shibuya et al.

(10) Patent No.: US 8,024,018 B2
(45) Date of Patent: Sep. 20, 2011

(54) ELECTRONIC APPARATUS

(75) Inventors: Makoto Shibuya, Fuchu (JP); Manabu Yamazaki, Hino (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 640 days.

(21) Appl. No.: 12/128,661

(22) Filed: May 29, 2008

(65) Prior Publication Data

US 2008/0311964 A1    Dec. 18, 2008

(30) Foreign Application Priority Data

Jun. 12, 2007  (JP) ................................ P2007-155580

(51) Int. Cl.
*H01H 3/42*    (2006.01)
(52) U.S. Cl. .................. 455/575.4; 455/575.1; 359/443; 361/679.1
(58) Field of Classification Search .................... None
See application file for complete search history.

(56) References Cited

U.S. PATENT DOCUMENTS

2006/0061859 A1*  3/2006  Chen et al. ..................... 359/443
2006/0073858 A1*  4/2006  Nagashima ................ 455/575.4

FOREIGN PATENT DOCUMENTS

JP          2004-335644 A    11/2004

* cited by examiner

*Primary Examiner* — Phuoc Doan
(74) *Attorney, Agent, or Firm* — Maschoff Gilmore & Israelsen

(57) ABSTRACT

According to one embodiment, an electronic apparatus includes: an outer case formed of a thin metal plate and having a front plate and side plates surrounding the front plate, the side plate having a protrusion formed by bending an edge of the side plates inward of the outer case to prevent exposing the edge to exterior of the electronic apparatus; a middle member formed of a resin material and formed correspondingly to an inner surface of the outer case, the middle member having a side member that confronts the side plate, the side member having a retaining portion to engage with the protrusion; and a casing having a support portion and configured to confront an inside of the side member to keep the protrusion engaged with the retaining portion by preventing the side member from deflection.

10 Claims, 15 Drawing Sheets

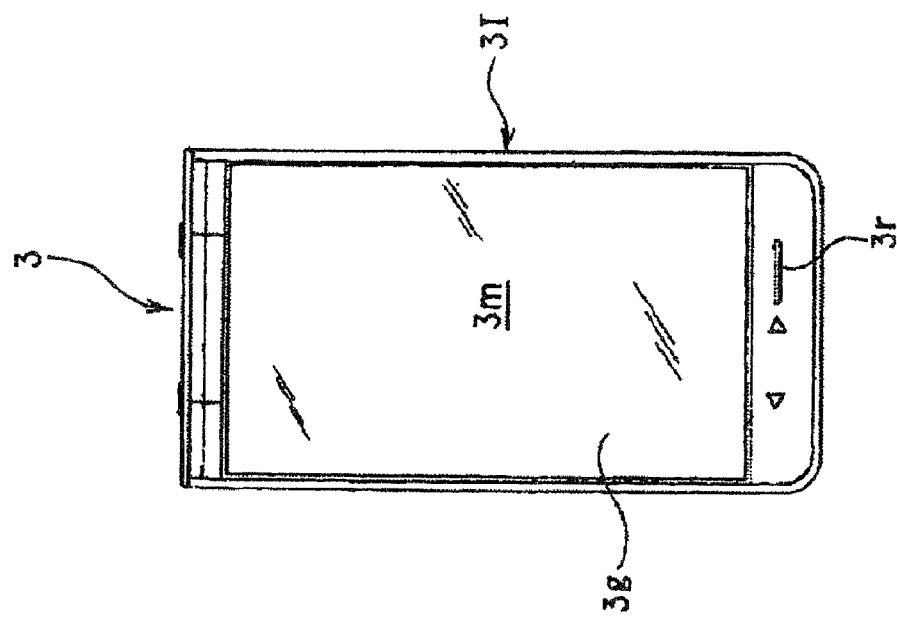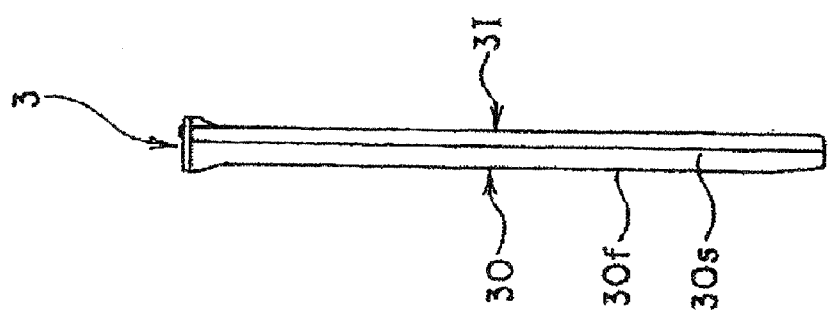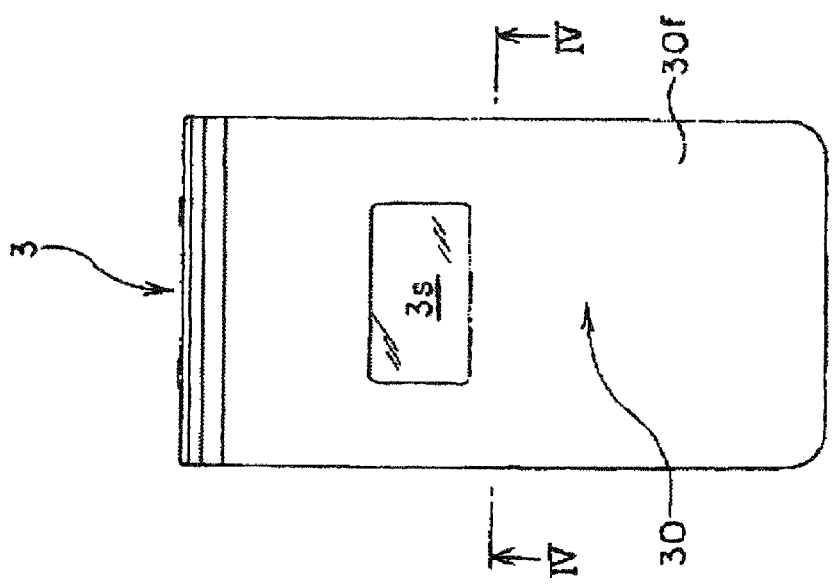

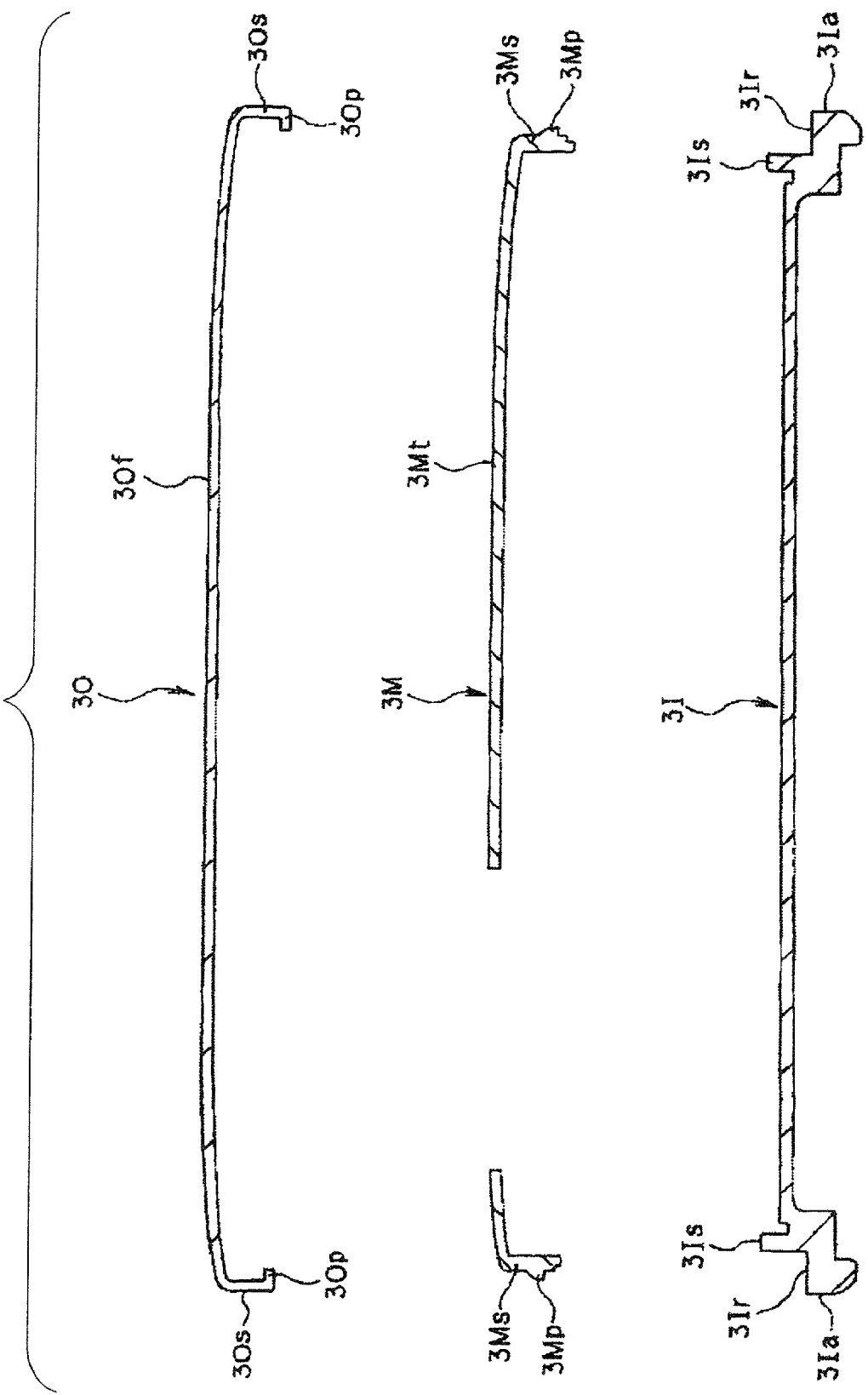

ELECTRONIC APPARATUS

CROSS-REFERENCE TO RELATED APPLICATIONS

This application is based upon and claims the benefit of priority from Japanese Patent Application No. 2007-155580, filed Jun. 12, 2007, the entire contents of which are incorporated herein by reference.

BACKGROUND

1. Field

One embodiment of the invention relates to an electronic apparatus in which an outer case formed of a thin metal plate is mounted in an apparatus case, with a middle member formed of a resin material interposed therebetween.

2. Description of the Related Art

Recently, some electronic apparatuses, particularly, some portable electronic apparatuses have an apparatus case formed of a metal plate in order to realize the slimness and improve the strength (for example, see JP-A-2004-335644).

Moreover, there is provided a cellular phone which is an example of the electronic apparatus, in which an outer case formed of a metal plate is mounted outside the apparatus case in order to improve the strength, a sense of beauty, and a sense of touch.

As shown in FIGS. 15 and 16, a known cellular phone A includes a lower case B with several operational keys and the like, an upper case C with a liquid crystal display unit and the like, and a hinge H interposed therebetween so as to be opened and closed.

The upper case C of the cellular phone A is configured in a manner in which an outer case O formed of a thin metal plate by a press molding process is attached outside an upper inner case I made of a magnesium alloy, for example, with a middle case (middle member) M formed of a resin material interposed therebetween.

The outer case O includes a front plate of and side plates Os bent from the borders of the front plate Of. The middle case M also includes a top plate Mt and circumferential plates Ms bent from the borders of the top plate Mt. The middle case M is fixed to the inner surface of the outer case O using a strong adhesive or a double-sided adhesive tape.

Attachment bosses Mb are formed on the top plate Mt of the middle case M. In addition, the outer case O is fixed to the upper inner case I, with the middle case M interposed therebetween by screw-fixing the upper inner case I to the attachment bosses Mb.

Various circuit boards E are mounted in the upper inner case I, and a liquid crystal display unit L and a cover glass G are attached to the front surface of the upper inner case I (lower side of FIG. 16).

In the outer circumferential border of the upper inner case I, a rib Ir is formed for covering an edge Oe of the outer case O formed of a thin metal plate in order to prevent the edge Oe of the outer case O from being exposed to the outside and from being damaged by user's fingers beforehand.

However, in the known cellular phone A described above, the edge Oe of each side plate Os of the outer case O is covered with the rib Ir formed in the outer circumferential border of the upper inner case I. For that reason, the rib Ir is exposed to the outside across the entire circumference of the side plates Os of the outer case O. Accordingly, even though the outer case O is made of metal, there occurs a problem in that design of the cellular phone becomes deteriorated.

Moreover, in the known cellular phone A, the middle case M and the outer case O are fixed with each other by the strong adhesive or the like, as described above. For that reason, when a large external force is applied to the outer case O against the adhesive force in a case where the middle case M and the outer case O are detached from each other in order to make repair, the outer case O formed of the thin metal plate becomes distorted. Accordingly, there occurs a problem in that the repair job is difficult.

SUMMARY

According to one aspect of the invention, there is provided an electronic apparatus including: an outer case formed of a thin metal plate and having a front plate and side plates surrounding the front plate, the side plate having a protrusion formed by bending an edge of the side plates inward of the outer case to prevent exposing the edge to exterior of the electronic apparatus; a middle member formed of a resin material and formed correspondingly to an inner surface of the outer case, the middle member having a side member that confronts the side plate, the side member having a retaining portion to engage with the protrusion; and a casing having a support portion and configured to confront an inside of the side member to keep the protrusion engaged with the retaining portion by preventing the side member from deflection.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3(*a*) is an exemplary top view illustrating an outer case of an upper case in the cellular phone shown in FIG. 1. FIG. 3(*b*) is an exemplary side view illustrating the outer case. FIG. 3(*c*) is an exemplary end view illustrating a liquid crystal display of the cellular phone.

FIG. 7 is an exemplary end view illustrating the outer case, a middle member, and the upper inner case constituting the upper case in the cellular phone shown in FIG. 1.

FIG. 8(*b*) is an exemplary end view illustrating the sectional surface of major elements in a state where the outer case and the middle member incorporated with each other is mounted in an apparatus case.

DETAILED DESCRIPTION

Hereinafter, embodiments of the invention will be described in detail with reference to the drawings.

Figure 1:
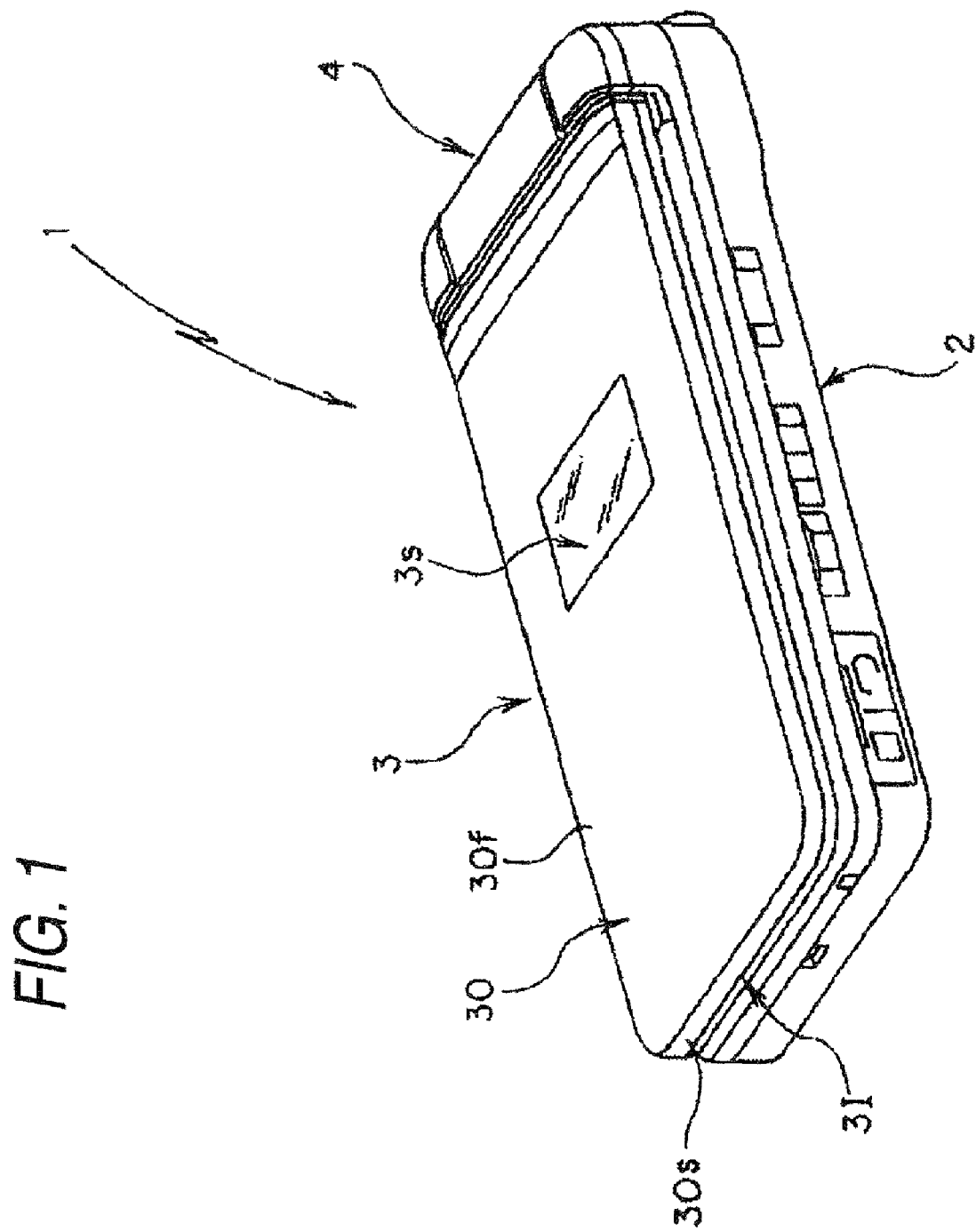
FIG. 1 is an exemplary perspective view illustrating an outer appearance of a cellular phone as an example of an electronic apparatus according to an embodiment.
Figure 2A:
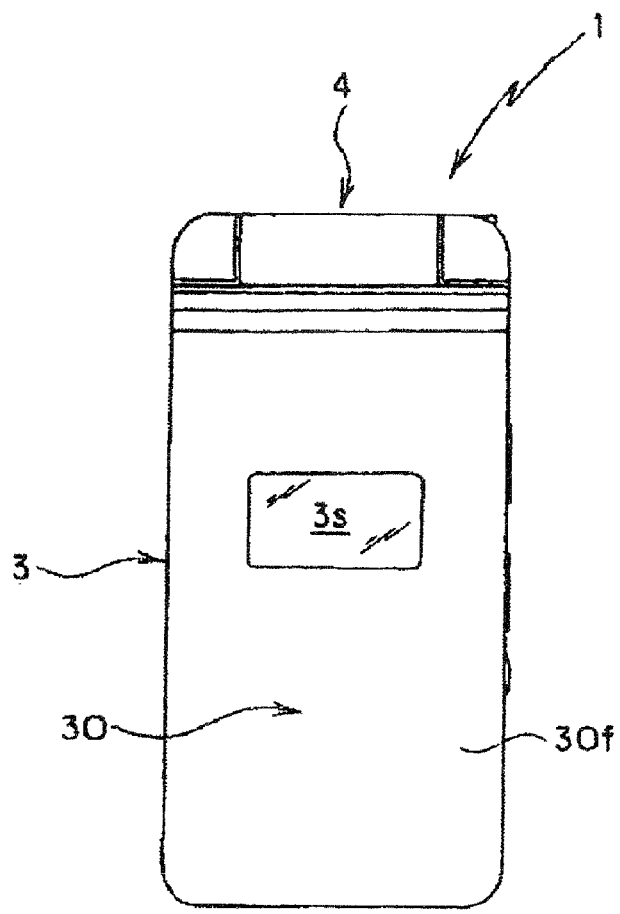
FIGS. 2(*a*), 2(*b*), and 2(*c*) are an exemplary front view, an exemplary side view, and an exemplary end view illustrating the cellular phone shown in FIG. 1, respectively.
Figure 2B:
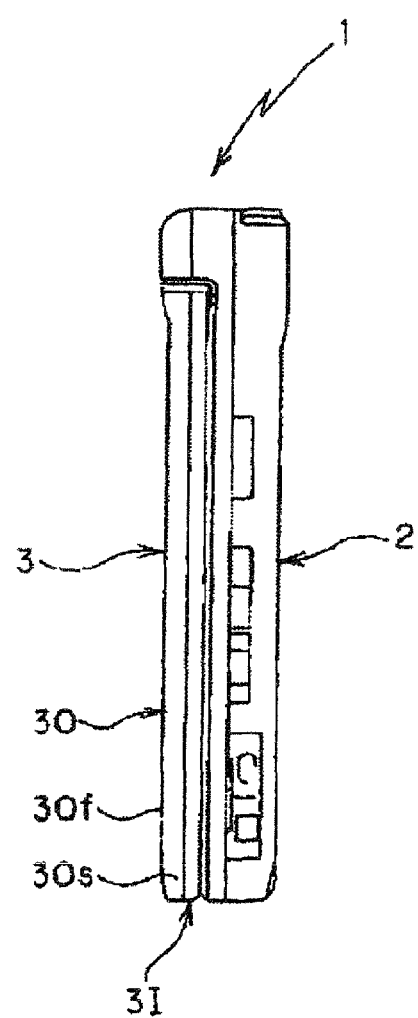
Figure 2C:
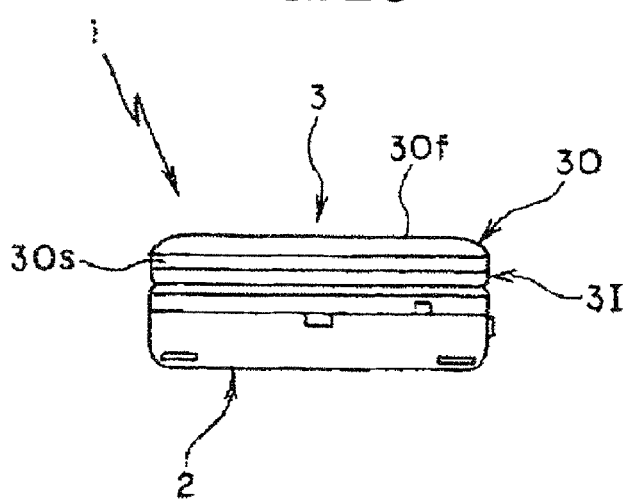

FIGS. 1 to 8 are diagrams illustrating a cellular phone, which is one example of an electronic apparatus, according to an embodiment of the invention. As shown in FIGS. 1 and 2, a cellular phone 1 includes a lower case 2 forming a main body and an upper case 3 forming a cover body. The lower case 2 and the upper case 3 are connected to each other so as to be opened and closed, with a connection body 4 having a rotatable two-pivotal hinge mechanism (not shown) interposed therebetween, and moreover they are pivotably connected to each other about a pivot shaft perpendicular to an opening/closing shaft.

As shown in FIG. 3, the upper case 3 of the cellular phone 1 has an outer shape similar to a very flat rectangle. A large main liquid crystal screen 3m, an ear piece 3r, and the like are provided on a front surface of the upper case 3 and a small sub-liquid crystal screen 3s is provided on a rear surface of the upper case 3.

Figure 4:
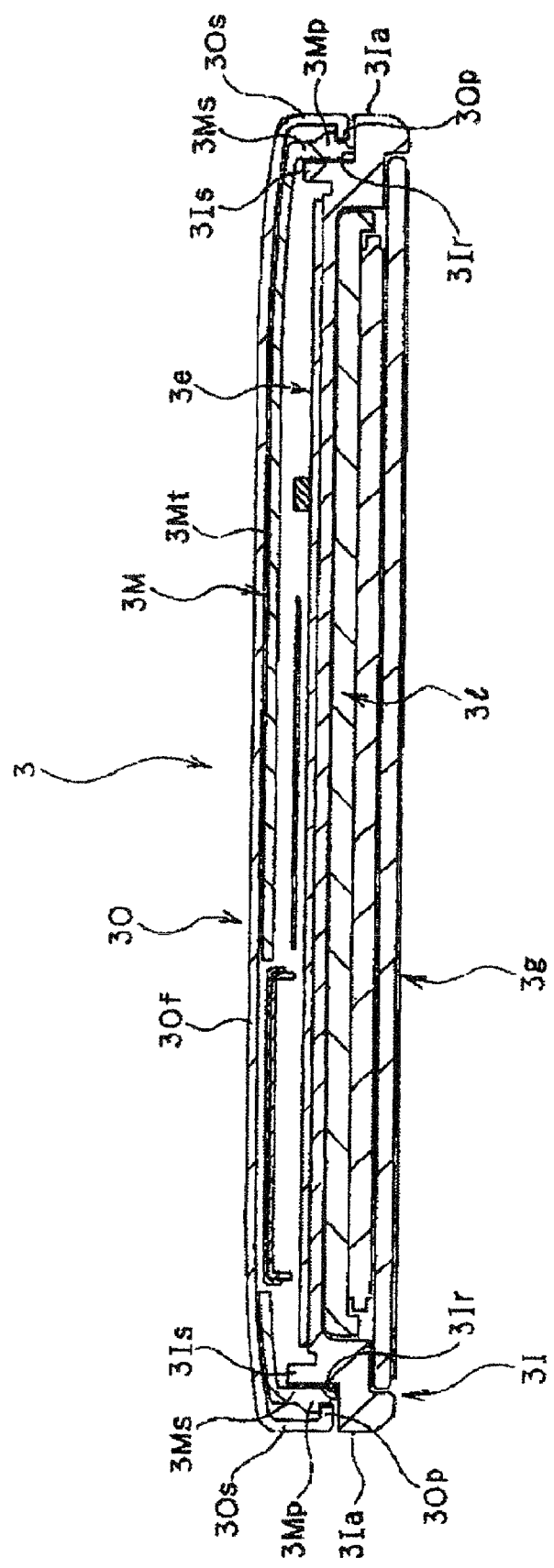
FIG. 4 is an exemplary sectional view taken along the line IV-IV shown in FIG. 3.
Figure 5:
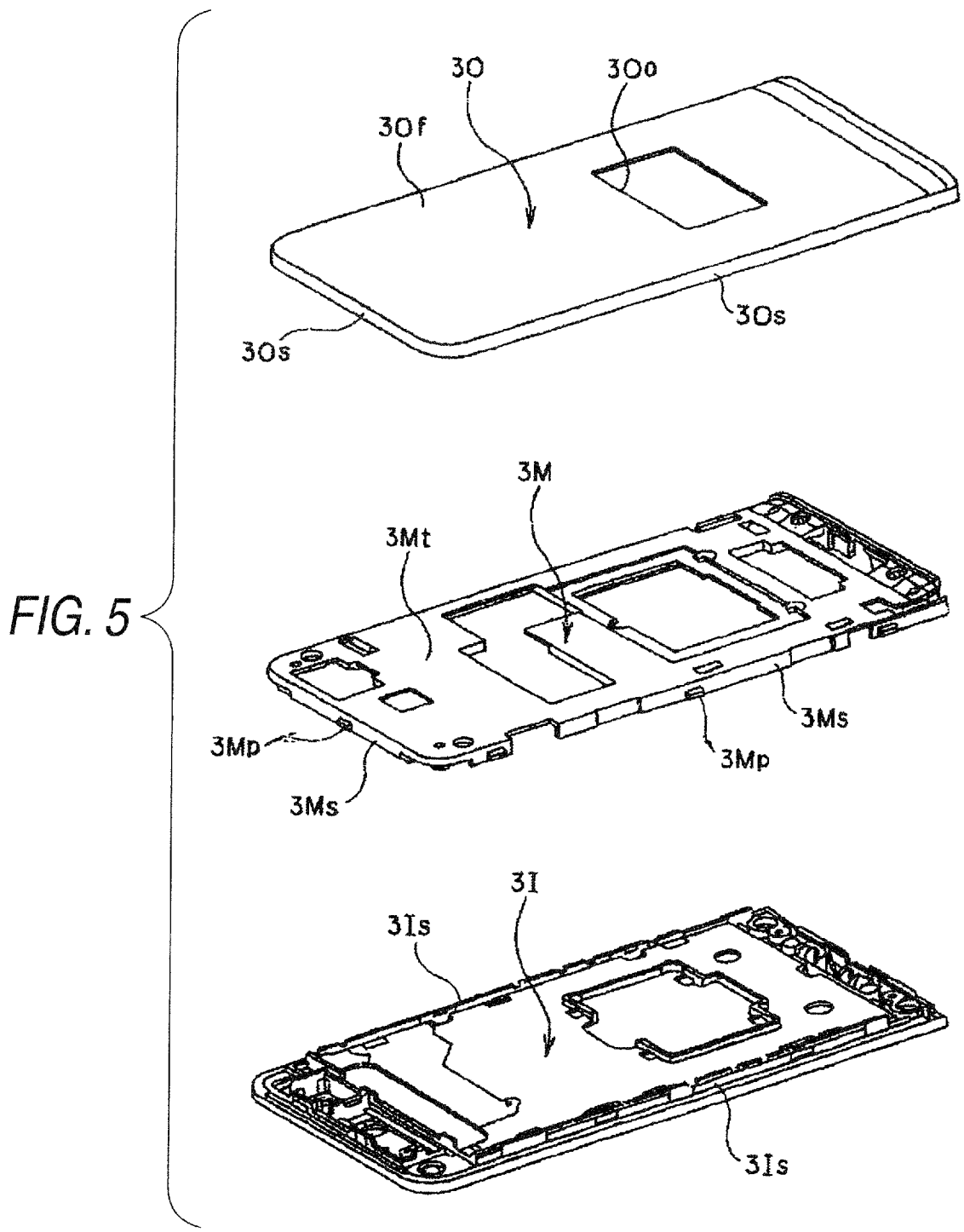
FIG. 5 is an exemplary exploded view illustrating the outer case, a middle member, and an upper inner case constituting the upper case in the cellular phone shown in FIG. 1.
Figure 6:
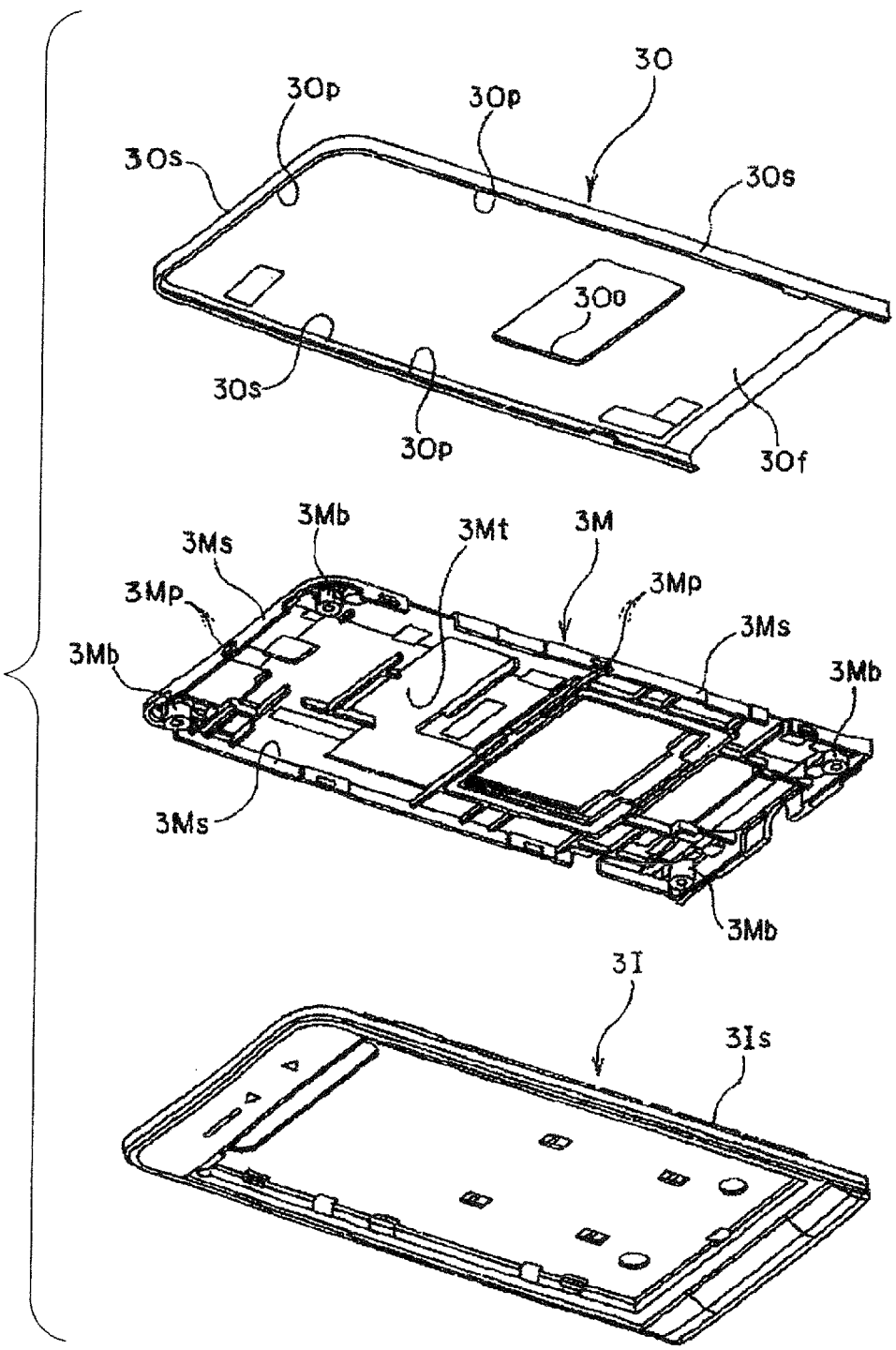
FIG. 6 is an exemplary exploded view illustrating the outer case, a middle member, and the upper inner case constituting the upper case in the cellular phone shown in FIG. 1.

As shown in FIG. 4, the upper case 3 of the cellular phone 1 includes an upper inner case (apparatus case) 3I made of a magnesium alloy, for example, a middle case (middle member) 3M formed of a resin material, and an outer case 3O formed by a press molding process with a thin metal plate. The outer case 3O is mounted on the outside of the upper inner case 3I, with the middle case 3M interposed therebetween.

In the inside of the upper case 3, a board 3e is mounted on the upper inner case 3I. In addition, a liquid crystal display unit 3l and a cover glass 3g are attached to the front surface of the upper inner case 3I (lower side of FIG. 4).

As shown in FIGS. 4 to 7, the outer case 3O forming a part of the upper case 3 includes a front plate 3Of formed in a substantially rectangular plane shape and side plates 3Os bent from the border portion of the front plate 3Of. An opening 3Oo for the sub-liquid crystal screen 3s (see FIGS. 1 to 3) is formed in the front plate 3Of.

In the lower border of the side plates 3Os of the outer case 3O, an edge of the metal plate is subjected to a bending process so as to be inward formed in L-shaped cross section with respect to each side plate 3Os so that the edge of the metal plate is not exposed outward. In addition, the protrusion 3Op which protrudes in an inward direction of each side plate 3Os is formed by the border portion subjected to the bending process.

On the other hand, the middle case 3M forming a part of the upper case 3 includes a top plate 3Mt corresponding to the front plate 3Of of the outer case 3O and circumference plates 3Ms bent from the borders of the top plate 3Mt. An engagement claw (engagement portion) 3Mp which engages with the protrusion 3Op of the above-described outer case 3O is formed on the outer surface of each circumference plate 3Ms.

The middle case 3M is intruded and fixed to the outer case 3O by fitting the middle case 3M corresponding to the inner surface of the above-described outer case 3O and engaging each engagement claw (engagement portion) 3Mp with each protrusion 3Op of the outer case 3O.

The front plate 3Of of the outer case 3O and the top plate 3Mt of the middle case 3M are adhered to each other by a double-sided adhesive tape (not shown) with weak adhesion, which is effective in fixing the middle case 3M to the outer case 3O.

On the other hand, the upper inner case 3I forming a part of the upper case 3 has a substantially rectangular plane shape corresponding to the outer case 3O and the middle case 3M described above. In addition, the upper inner case 3I is screw-fixed to an attachment boss (not shown) formed in the middle case 3M so as to be integrally formed with the outer case 3O and the middle case 3M.

In the outer circumference border of the upper inner case 3I, there is formed a stepped portion 3Ir in which the outer case 3O and the middle case 3M overlap with each other when mounted and receives the lower end of each side plate 3Os and each circumference plate 3Ms. An outer circumferential surface 3Ia of the upper inner case 3I is flush with each side plate 3Os of the outer case 3O.

A support portion 3Is located within each circumference 3Ms in the middle case 3M is formed in the upper inner case 3I in a state where the support portion 3Is is mounted in the middle case 3M. Moreover, the support portion 3Is prevents each circumference plate 3Ms from being curved.

Figure 8A:
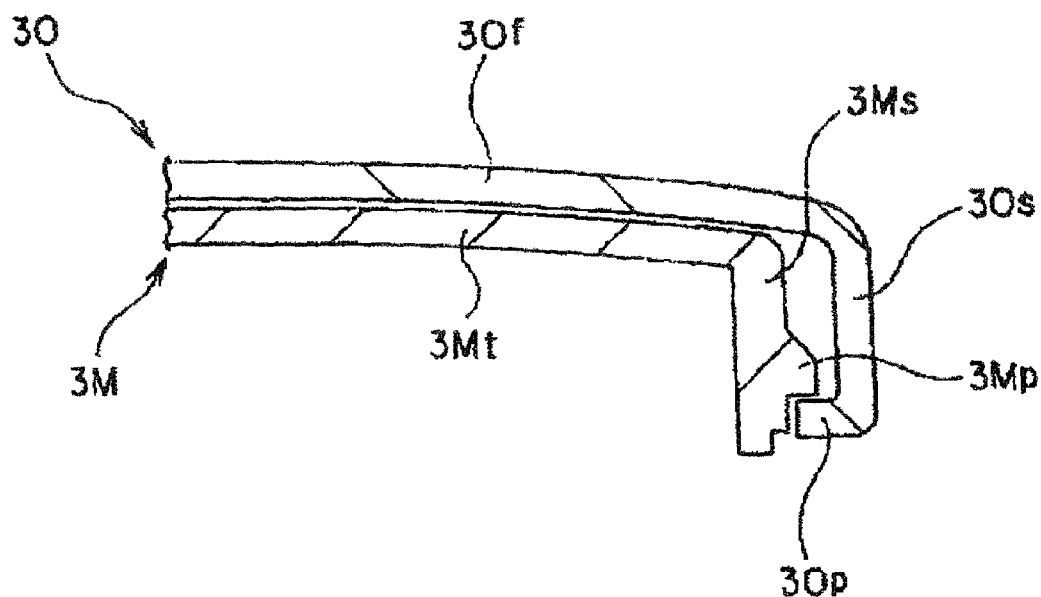
FIG. 8(*a*) is an exemplary end view illustrating the sectional surface of major elements in a state where the outer case constituting the upper case in the cellular phone shown in FIG. 1 is mounted in the middle member.

In a case of mounting the above-described upper case 3, the middle case 3M is first intruded into the inner surface of the outer case 3O, as shown in FIG. 8(a), and then each engagement claw (engagement portion) 3Mp of the middle case 3M is engaged with each protrusion 3Op of the outer case 3O.

At this time, since the middle case 3M is formed of a resin material, it is possible to easily engaging each engagement claw (engagement portion) 3Mp with each protrusion 3Op of the outer case 3O by curving each circumference plate 3Ms of the middle case 3M.

Figure 8B:
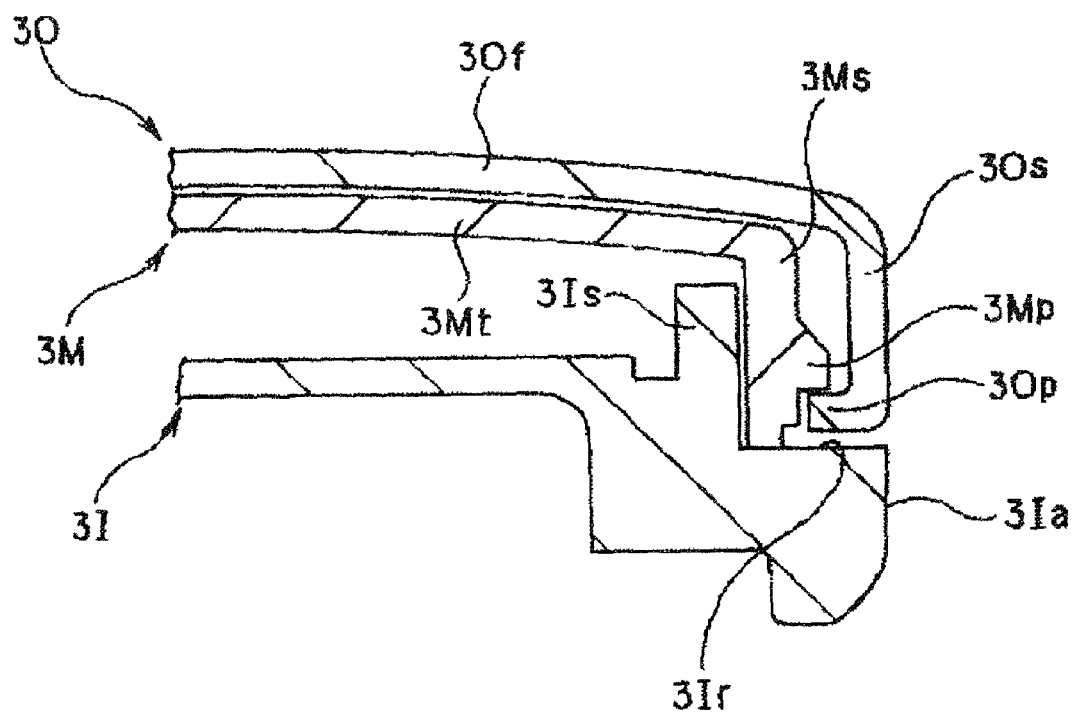

Next, as shown in FIG. 8(b), the outer case 3O, the middle case 3M, and the upper inner case 3I are integrally mounted to each other by screw-fixing the upper inner case 3I to the attachment boss (not shown) formed in the middle case 3M.

At this time, the edge of the outer case 3O is received in the stepped portion 3Ir of the upper inner case 3I so as not to be exposed outward. In addition, each side plate 3Os of the outer case 3O and the outer circumferential surface 3Ia of the upper inner case 3I form one smooth side surface.

In the state where the upper inner case 3I is mounted, the support portion 3Is formed in the upper inner case 3I is positioned within each circumference plate 3Ms of the middle case 3M and suppresses the inward bending of each circumference plate 3Ms. Accordingly, it is possible to prevent each engagement claw (engagement portion) 3Mp from being detached from each protrusion 3Op, thereby firmly mounting the upper inner case 3I and the middle case 3M to each other.

On the other hand, in a case where the upper case 3 is dissembled to perform a repair job, the upper inner case 3I is first separated from the middle case 3M, each engagement claw (engagement portion) 3Mp of the middle case 3M is detached from each protrusion 3Op of the outer case 3O, and then the middle case 3M is separated from the inner surface of the outer case 3O.

At this time, since the middle case 3M is made of the resin material, it is possible to easily detach each engagement claw (engagement portion) 3Mp from each protrusion 3Op of the outer case 3O by curving each circumference plate 3Ms of the middle case 3M.

In the cellular phone 1 having the above-described configuration, the lower border of each side plate 3Os in the outer case 3O of the upper case 3 is subjected to the inward bending process so that the edge of the metal plate is not exposed to the outside. Accordingly, it is possible to surely prevent the edge of the outer case 3O from being exposed to the outside and from being damaged by a user. Therefore, since it is not necessary to additionally form a part of the case to cover the edge of the outer case 3O, it is possible to improve a design.

Each protrusion 3Op can be formed in the outer case 3O by a simple process by forming each protrusion 3Op of the outer case 3O in L-shaped cross section with respect to each side 3Os. Accordingly, rigidity of the outer case 3O against an external force is improved by additionally subjecting the lower border of each side plate 3Os of the outer case 3O to the bending process. Therefore, it is possible to improve mechanical strength of the upper case 3 and the cellular phone 1.

The lower border of each plate 3Os of the outer case 3O is processed so as be bent inward to form each protrusion 3Op which protrudes in the inward direction of each side plate. Moreover, each engagement portion 3Mp which engages with each protrusion 3Op of the outer case 3O is formed on each circumference plate 3Ms of the middle case 3M made of the resin material, and each protrusion 3Op and each engagement portion 3Mp engage with each other. In this way, the outer case 3O and the middle case 3M are integrally mounted to each other. Accordingly, it is possible to attach or detach the outer case 3O and the middle case 3M to or from each other by deforming each circumference plate 3Ms of the middle case 3M made of the resin material. As a result, the repair job can be easily performed.

The support portion 3Is positioned within each circumference plate 3Ms of the middle case 3M is formed in the upper inner case 3I mounted in the middle case 3M, and the engagement of each protrusion 3Op and each engagement portion 3Mp is maintained by suppressing the bending of each circumference plate 3Ms. Accordingly, it is possible to surely fix the middle case 3M and the outer case 3O so as not to be separated from each other in the state where the middle case 3M is mounted in the upper inner case 3I.

Figure 9:
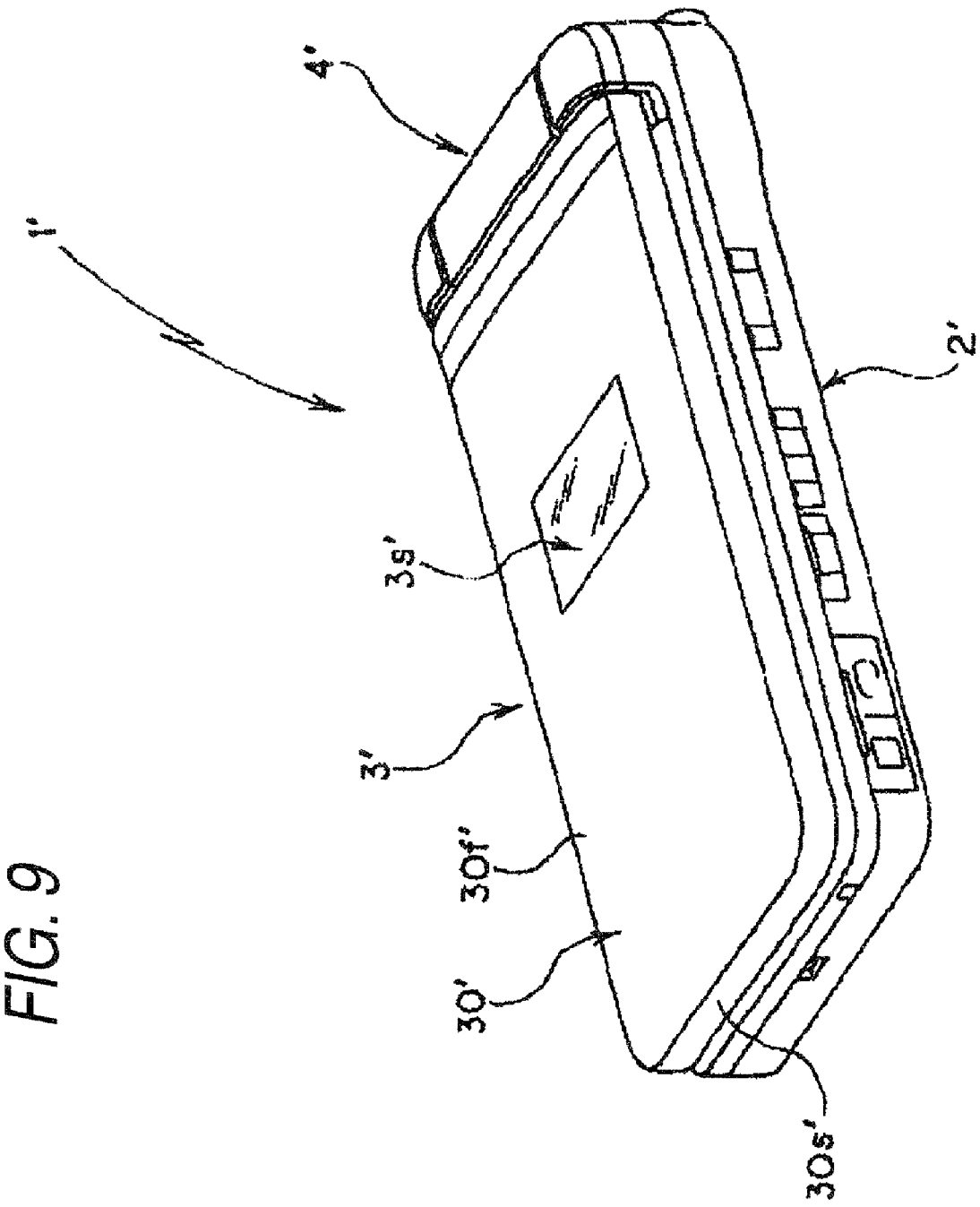
FIG. 9 is an exemplary perspective view illustrating an outer appearance of a cellular phone as an example of an electronic apparatus according to another embodiment of the invention.
Figure 10:
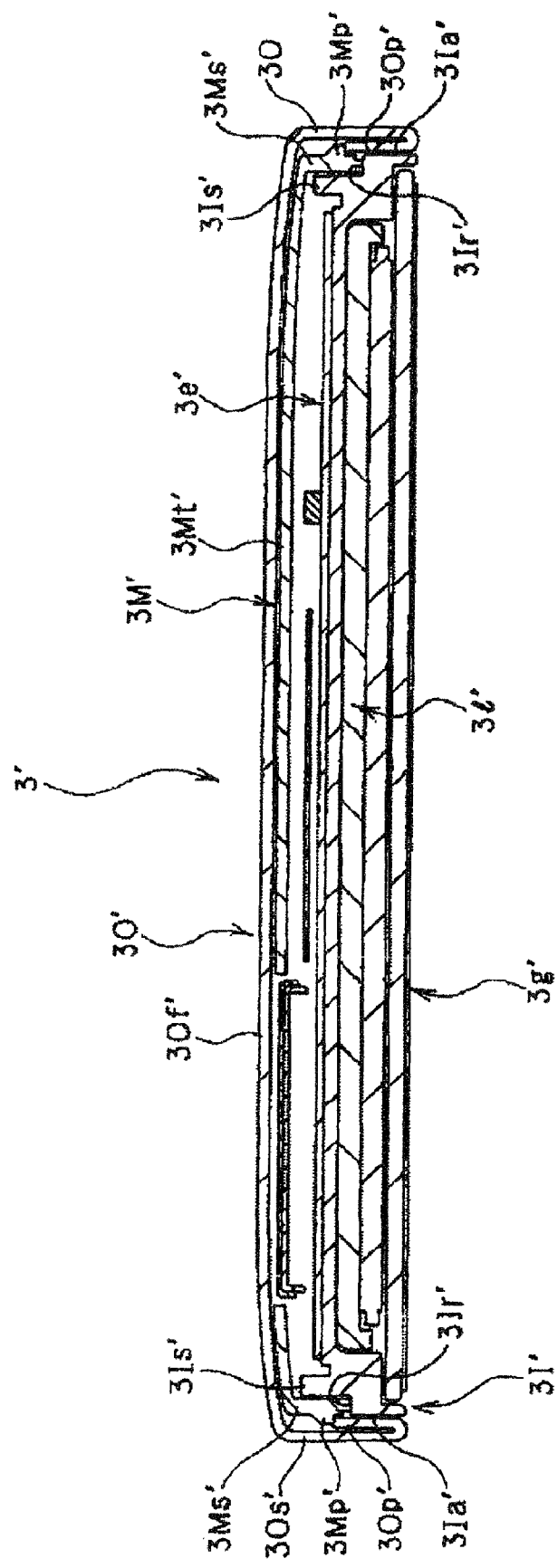
FIG. 10 is an exemplary end view illustrating the sectional surface of the upper case in the cellular phone shown in FIG. 9.
Figure 11A:
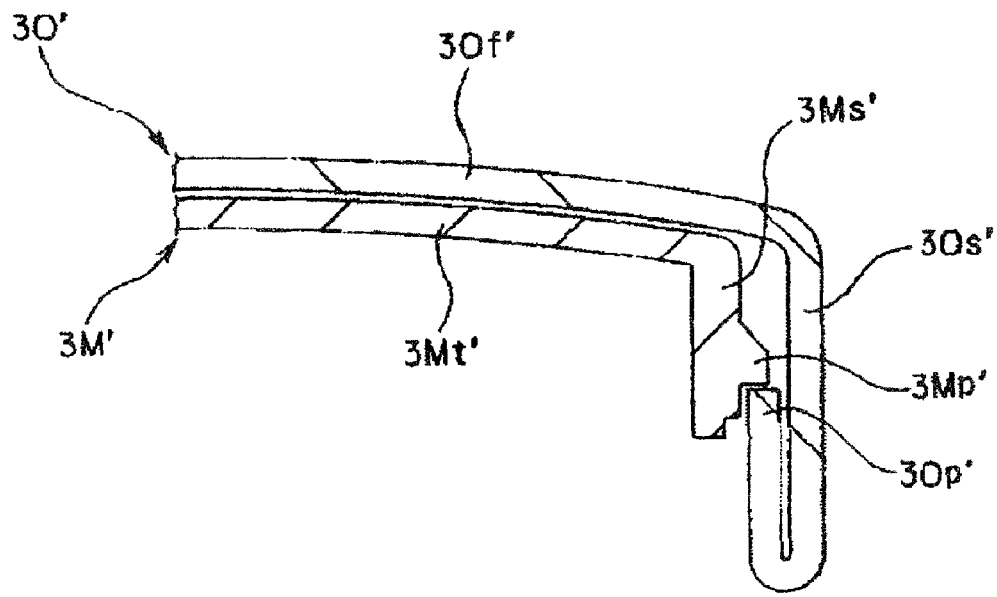
FIG. 11(a) is an exemplary end view illustrating the sectional surface of major elements in a state where an outer case constituting the upper case in the cellular phone shown in FIG. 9 is mounted in a middle member.
Figure 11B:
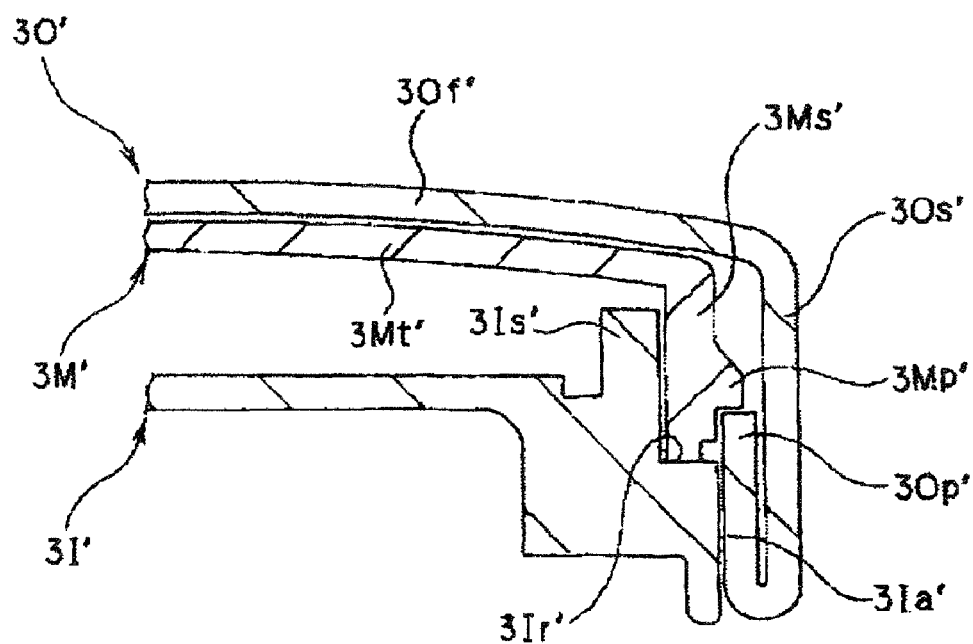
FIG. 11(b) is an exemplary end view illustrating the sectional surface of major elements in a state where the outer case and the middle member incorporated with each other is mounted in an apparatus case.

FIGS. 9 to 11 are diagrams illustrating a cellular phone according another embodiment of the invention. An upper case 3' of the cellular phone 1' includes an upper inner case (apparatus case) 3I' made of a magnesium alloy, for example, a middle case (middle member) 3M' formed of a resin material, and an outer case 3O' formed by a press molding process with a thin metal plate.

The outer case 3O' includes a front plate 3Of' and side plates 3Os' bent from the border portion of the front plate 3Of'. The lower borders of the side plates 3Os' are subjected to a bending process so as to be inward formed in J-shaped cross section with respect to the side plates 3Os' so that the edge of the metal plate is not exposed outward. In addition, a protrusion 3Op' which protrudes in an inward direction of each side plate 3Os' is formed by each border subjected to the bending process.

The middle case 3M' includes a top plate 3Mt' corresponding to the front plate 3Of' of the outer case 3O' and circumference plates 3Ms' bent from the borders of the top plate 3Mt'. An engagement claw (engagement portion) 3Mp' which engages with each protrusion 3Op' of the above-described outer case 3O' is formed on an outer surface of each circumference plate 3Ms'.

In the upper inner case 3I', a stepped portion 3Is' for receiving each circumference plate 3Ms' of the middle case 3M' and a support portion 3Ir' positioned within each circumference plate 3Ms' are formed in a state where the upper inner case 3I' is mounted in the middle case 3M'. An outer circumferential surface 3Ia' of the upper inner case 3I' is positioned in an inner surface of each side plate 3Os' of the outer case 3O'.

That is, the outer circumferential surface 3Ia' of the upper inner case 3I' is covered with an side wall 3Os' of the outer case 3O'. Accordingly, the entire outer circumferential surface of the upper case 3' is constituted by the side walls 3Os' of the outer case 3O'.

The configuration of the above-described cellular phone 1' is the same that of the cellular phone 1 shown in FIGS. 1 to 8 except for the shape of each side wall 3Os' including the protrusions 3O'p of the above-described outer case 3O' and the shape of the stepped portion 3Ir' and each outer circumferential surface 3Ia' of the upper inner case 3I'. The same reference numerals with addition of a prime mark thereafter are given to the operationally same elements shown in FIGS. 1 to 8, and the detailed description is omitted.

In the cellular phone 1' having the above-described configuration, the entire outer circumferential surface of the upper case 3' can be formed as each side wall 3Os' of the outer case 3O' by subjecting the lower border of each side wall 3Os' including the protrusion 3Op' of the outer case 3O' to the bending process to be bent inward so as to be formed in the sectional J shape. Accordingly, the design of the outer case 3O' made of metal can be sufficiently used.

Like the cellular phone 1 described above, in the cellular phone 1' having the above-described configuration, it is possible to surely prevent user's damage caused due to the exposure of the edge of the outer case 3O' and to easily perform a repair job. Of course, additionally operational advantages can be obtained in that a mechanical strength of the cellular phone 1' is improved, the outer case 3O' and the middle case 3M' can be surely fixed, and the like.

Figure 12A:
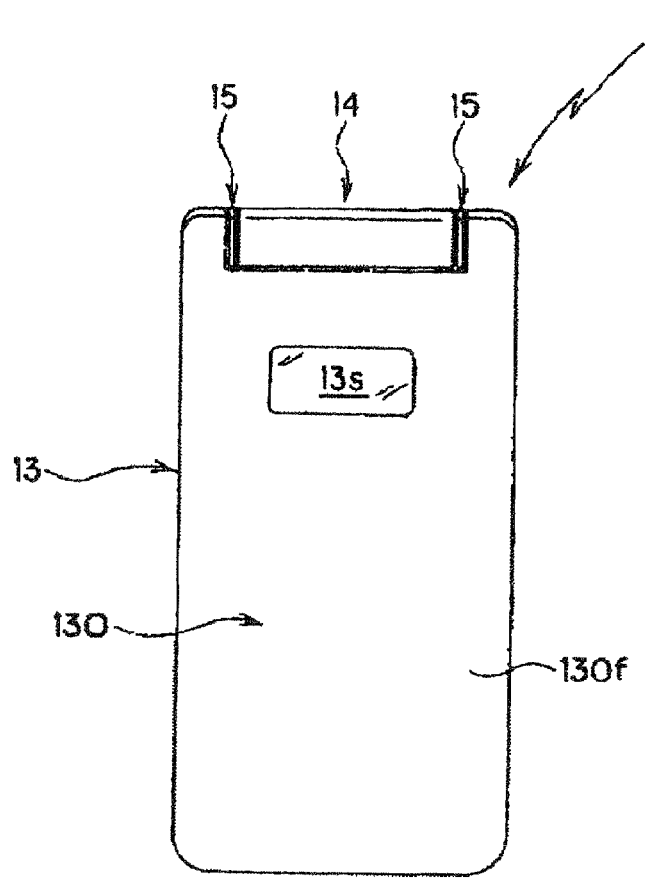
FIGS. 12(a), 12(b), and 12(c) are an exemplary front view, an exemplary side view, and an exemplary end view illustrating a cellular phone as an example of an electronic apparatus according to other embodiment, respectively.
Figure 12B:
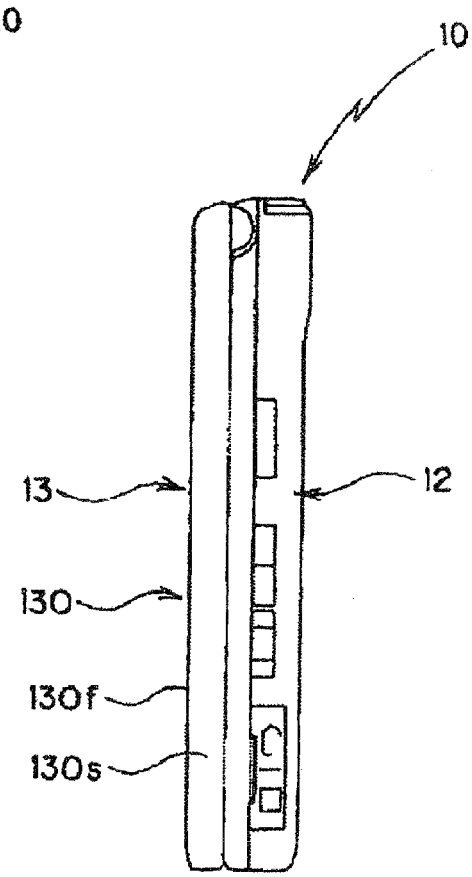
Figure 12C:
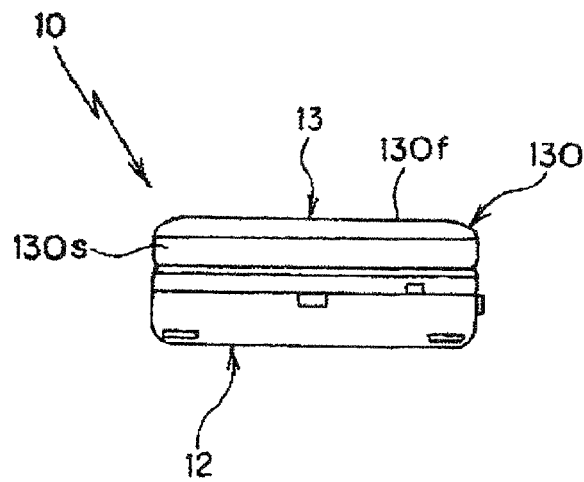
Figure 13A:
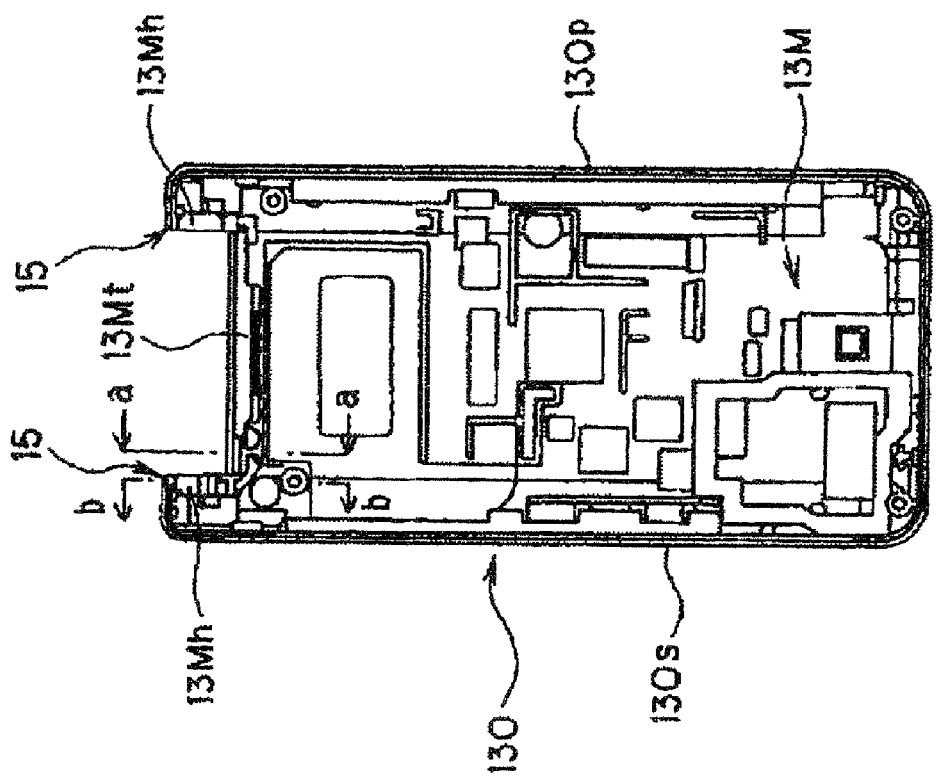
FIG. 13(a) is an exemplary top view illustrating an outer case viewed from the outside.
Figure 13B:
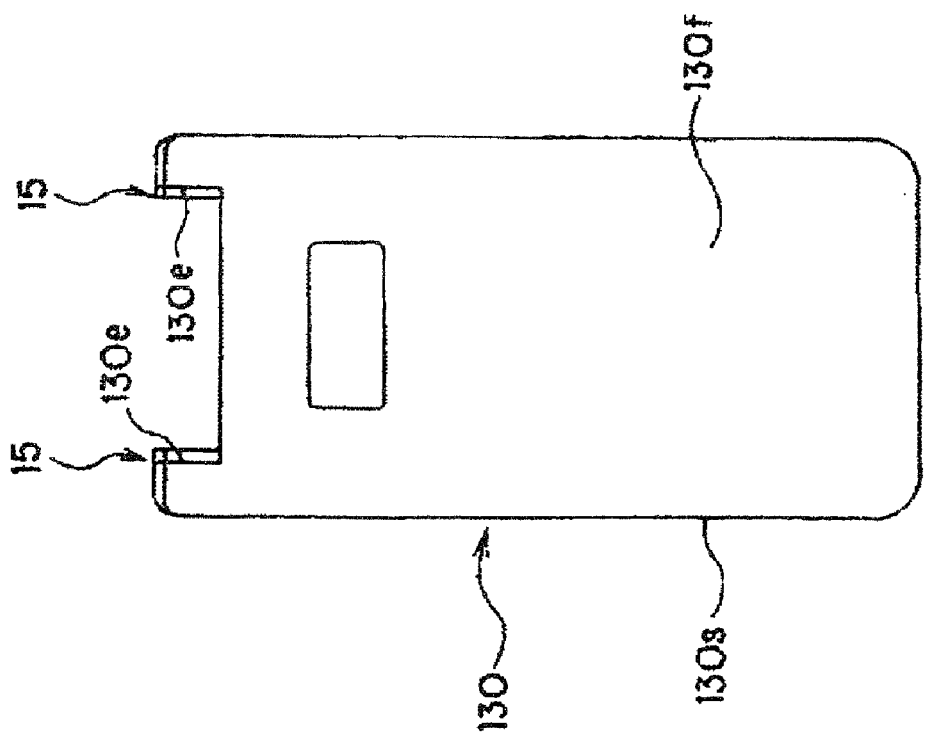
FIG. 13(b) is an exemplary top view illustrating the outer case mounted with a middle member viewed from the inside.
Figure 14A:
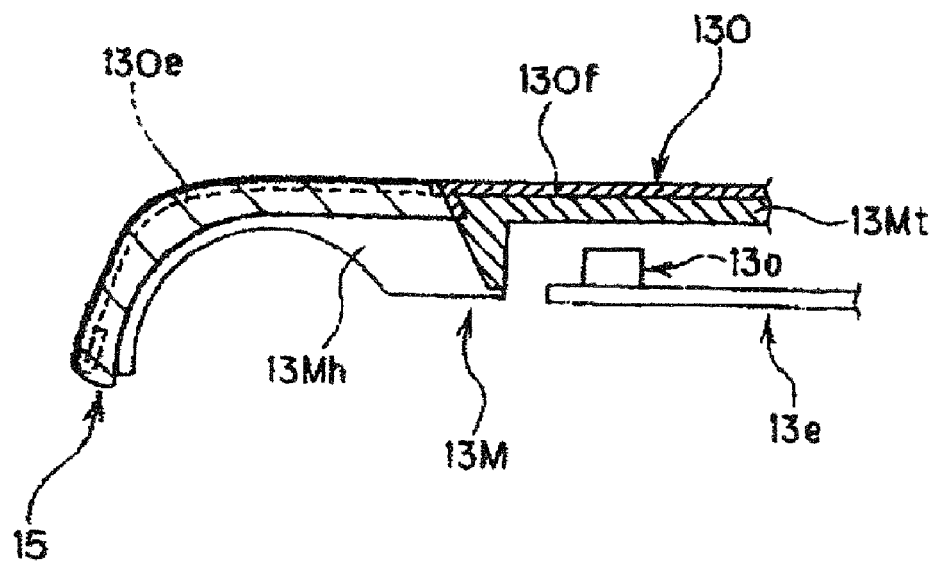
FIG. 14(a) is an exemplary sectional view taken along the line a-a shown in FIG. 13.
Figure 14B:
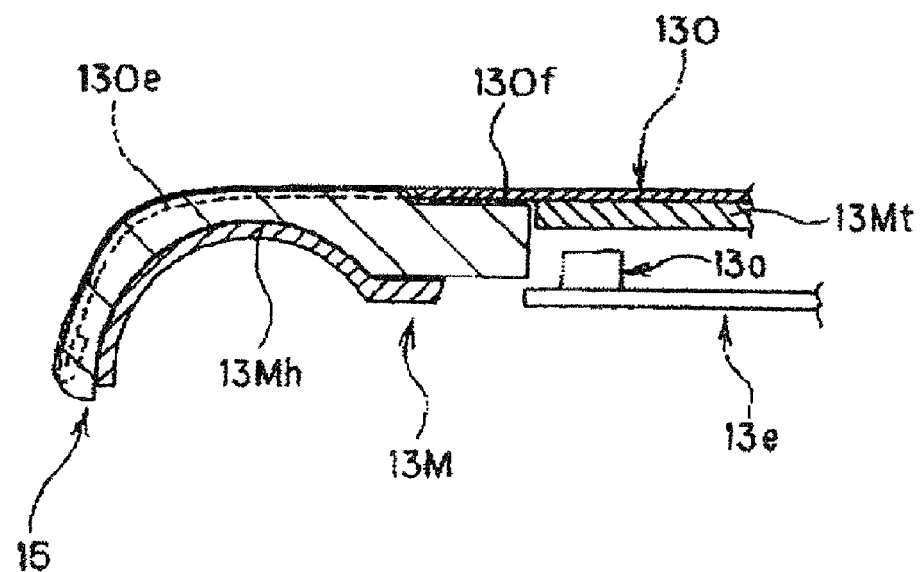
FIG. 14(b) is an exemplary sectional view taken along the line b-b shown in FIG. 13.
Figure 15:
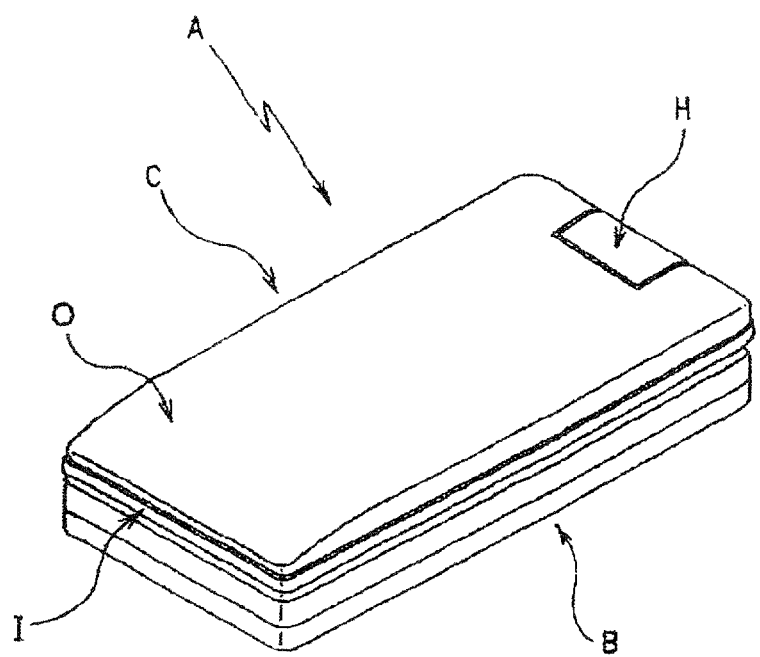
FIG. 15 is an exemplary perspective view illustrating a known cellular phone as an electronic apparatus.
Figure 16:
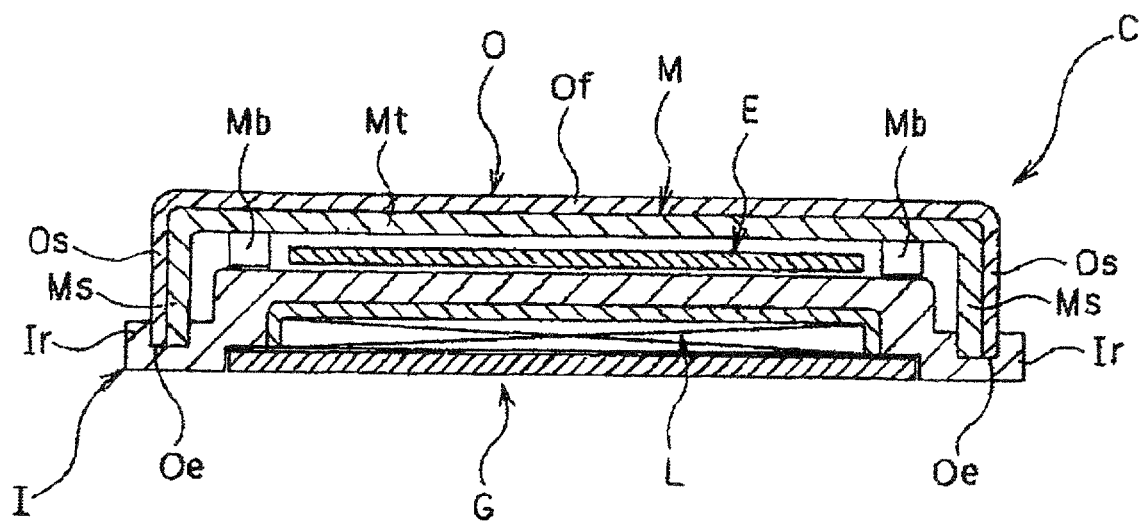
FIG. 16 is an exemplary end view illustrating the sectional surface of an upper case in the cellular phone shown in FIG. 15.

FIGS. 12 to 14 are diagrams illustrating a cellular phone according to other embodiment of the invention. A cellular phone 10 includes a lower case 12 forming a main body and an upper case 13 forming a cover body, which are connected to each other so as to be opened and closed, with a hinge member 14 interposed therebetween.

Illumination members 15 are provided in the right and left sides of the connection portion with the hinge member 14 in the end of the upper case 13. The illumination members 15 covers an edge portion 13Oe of the metal plate which is not subjected to the bending process in the outer case 13O which constitutes the upper case 13.

The illumination members 15 are attached to a holder portion 13Mh of the middle case 13M fixed to the inside of the outer case 13O and perform illuminating by radiation of an LED (light source) 13 on a board 13e received in the upper case 13.

The configuration of the above-described cellular phone 10 is the same that of the cellular phone 1' shown in FIGS. 9 to 11 except that the opening/closing mechanism of the lower case 12 and the upper case 13 is different, the pair of the right and left illumination members 15 are provided, and the shape of the middle case is difference because of the installation of the illumination members 15. The 10s reference numerals made by adding 10s number without the prime mark from the reference numerals shown in FIGS. 9 and 11 are given to the operationally same elements, and the detailed description is omitted.

In the cellular phone 10 having the above-described configuration, the illumination members 15 are provided to cover the edge portion 13Oe formed of the metal plate in the region of the outer case 13O which is not subjected to the bending process. With such a configuration, it is possible to surely prevent the user's damage caused by the exposure of the edge of the outer case 13O without deterioration of the design.

In the cellular phone 10 having the above-described configuration, the middle case 13M may be formed of a resin material having translucency, the illumination members 15 may be integrally formed with the middle case 13M, illumination of the LED (light source) 13o may reach the illumination members 15 through the middle case 13M. With such a configuration, it is possible to considerably reduce the number of the constitute elements.

Like the above-described cellular phone 1 and cellular phone 1', in the cellular phone 10 having the above-described configuration, it is possible to improve the design, to surely prevent user's damage caused due to the exposure of the edge of the outer case 13O', and to easily perform the repair job. Of course, additionally operational advantages can be obtained in that a mechanical strength of the cellular phone 10 is improved, the outer case 13O and the middle case 13M can be surely fixed, and the like.

In the above-described embodiments, the invention is applied to the cellular phone which is just one example of electrical apparatuses. However, the invention is not limited to communication apparatuses such as a cellular phone or PHS (Personal Handyphone Systems) or portable information terminals such as an electronic dictionary or PDA (Personal Data Assistance), but may be effectively applied to various electronic apparatuses in which an outer case formed of a thin metal plate is mounted in an apparatus case, with a middle member formed of a resin material interposed therebetween.

As described with the reference to the embodiment, there is provided an electronic apparatus capable of preventing an edge of an outer case from being exposed and from being damaged by a user, and improving the design.

As described with the reference to another embodiment, there is provide the electronic apparatus capable of facilitating attachment or detachment of the outer case to or from a middle member in order to easily perform a repair job.

In the electronic apparatus according to an aspect, the lower borders of the side plates in the outer case are subjected to the bending process to be bent inward so that the edge of the metal plate is not exposed to the outside. With such a configuration, it is possible to surely prevent the edge of the outer case from being exposed and from being damaged by a user. Moreover, since it is not necessary to form a part of the case in order to cover the edge of the outer case, the design can be improved.

The lower borders of the side plates in the outer case are subjected to the bending process so as to be bent inward, the protrusions protruding inward are formed, the engagement portion for engaging the protrusions of the outer case are formed on the circumferential plates of the middle member formed of the resin material, and the outer case and the middle member are integrally formed with each other by engaging the protrusions to the engagement portions. With such a configuration, it is possible to facilitate the attachment or the detachment of the outer case to or from the middle member by deforming the circumferential plates of the middle member formed of the resin material. Accordingly, the repair job can be easily performed.

The support portions located inside the circumferential plates of the middle member are formed in the apparatus case mounted in the middle member. In addition, the support portions prevent the circumferential plates from being bent to maintain the engagement of the protrusions with the engagement portions. With such a configuration, the middle member and the outer case are not easily detached from each other in the state where the middle member is mounted in the apparatus case, thereby surely fixing them to each other.

The rigidity of the outer case against an external force can be improved by subjecting the lower borders of the side plates in the outer case. Moreover, it is possible to improve the strength of the electronic apparatus.

In the electronic apparatus according to another aspect, the protrusion of the outer case is formed in the sectional L shape with respect to the side plate. With such a configuration, it is possible to form the protrusion of the outer case by a simple process.

In the electronic apparatus according to another aspect, the protrusion of the outer case is formed in the sectional J shape with respect to the side plate. With such a configuration, it is possible to form the protrusion of the outer case by a simple process.

In the electronic apparatus according to another aspect, the illumination member which covers the edge of the metal plate is mounted in the area which is not subjected to the bending process in the outer case. With such a configuration, it is possible to surely prevent the edge of the outer case from being exposed and from being damaged by a user without deterioration of the design.

In the electronic apparatus according to another aspect, the middle member having translucency and the illumination member are integrally formed, such that illumination from the light source reaches the illumination member through the middle member.

What is claimed is:
1. An electronic apparatus comprising:
an outer case formed of a thin metal plate and having a front plate and side plates surrounding the front plate, the side plate having an inwardly extending edge formed by bending an edge of the side plate inward of the outer case to prevent exposing the edge to exterior of the electronic apparatus;
a middle member formed of a resin material and formed correspondingly to an inner surface of the outer case, the middle member having a side member that confronts the side plate, the side member having a retaining portion comprising a middle member protrusion formed on an outer surface of the side member which faces the inner surface of the outer case so as to engage with the protrusion of the outer case; and a casing having a support portion configured to confront an inside of the side member to keep the protrusion of the outer case engaged with the retaining portion by preventing the side member from deflection.

2. The electronic apparatus according to claim 1, wherein the protrusion of the outer case forms L-shaped cross-section with the side plate.

3. The electronic apparatus according to claim 1, wherein the protrusion of the outer case forms J-shaped cross section with the side plate.

4. The electronic apparatus according to claim 1 further comprising an illumination member that covers a part of the edge of the outer case, wherein the part of the edge is not subjected to bending inward, and the part of the edge is exposed to exterior of the electronic apparatus when the part of the edge is not covered by the illumination member.

5. The electronic apparatus according to claim 4, wherein the middle member having translucency and the illumination member are integrally formed, such that illumination from a light source reaches the illumination member through the middle member.

6. An electronic apparatus comprising:

an outer case formed of a thin metal plate and having a front plate and side plates surrounding the front plate, the side plate having an inwardly extending edge formed by bending an edge of the side plate inward of the outer case to prevent exposing the edge to exterior of the electronic apparatus;

a middle member formed of a resin material and formed to be opposed to an inner surface of the outer case, the middle member having a side member that confronts the side plate, the side member having a retaining portion comprising a middle member protrusion formed on an outer surface of the side member which faces the inner surface of the outer case so as to engage with the protrusion of the outer case; and a casing having a support portion configured to confront an inside of the side member to keep the protrusion of the outer case engaged with the retaining portion by preventing the side member from deflection.

7. The electronic apparatus according to claim 6, wherein the protrusion of the outer case forms L-shaped cross-section with the side plate.

8. The electronic apparatus according to claim 6, wherein the protrusion of the outer case forms J-shaped cross section with the side plate.

9. The electronic apparatus according to claim 6 further comprising an illumination member that covers a part of the edge of the outer case, wherein the part of the edge is not subjected to bending inward, and the part of the edge is exposed to exterior of the electronic apparatus when the part of the edge is not covered by the illumination member.

10. The electronic apparatus according to claim 9, wherein the middle member having translucency and the illumination member are integrally formed, such that illumination from a light source reaches the illumination member through the middle member.

* * * * *